June 20, 1933.    R. PAWLIKOWSKI    1,914,672
FOUR-STROKE INTERNAL COMBUSTION ENGINE
Original Filed Dec. 5, 1928
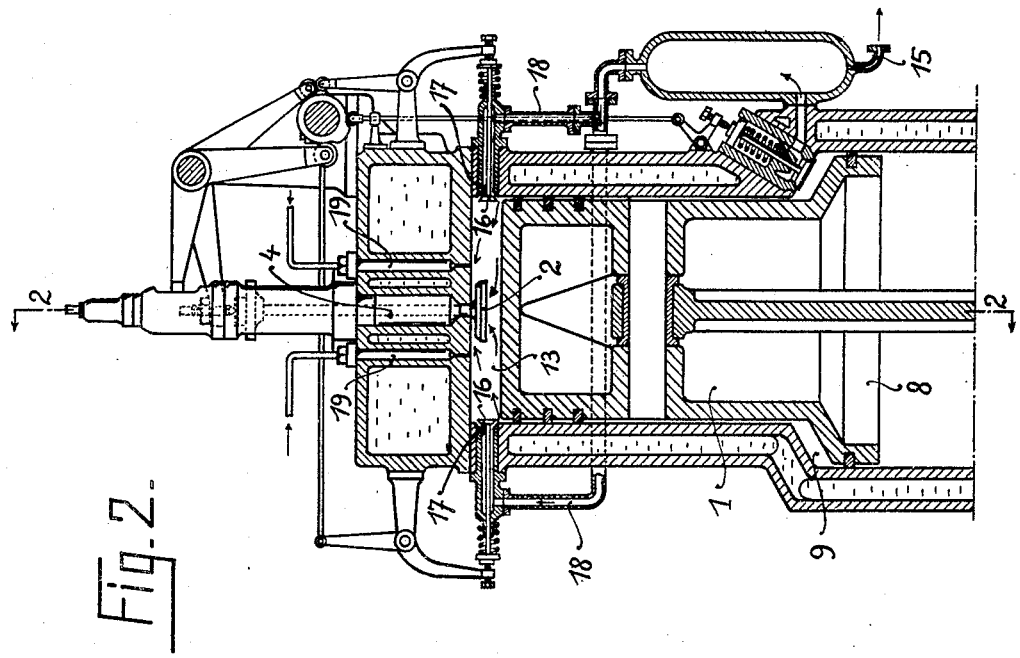
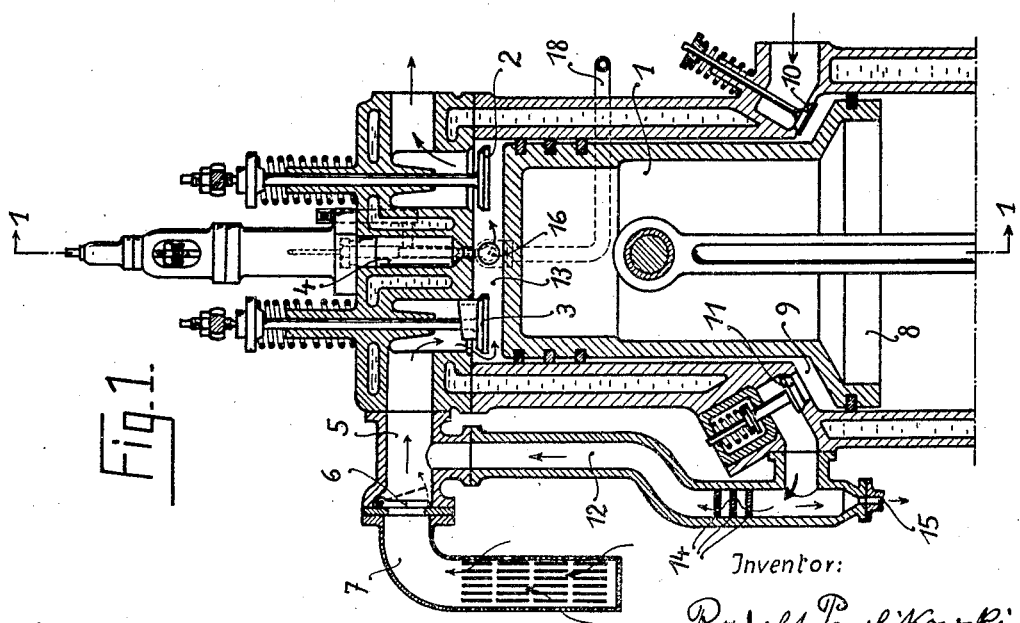
Inventor:
Rudolf Pawlikowski
Dipl. Ing.

Patented June 20, 1933

1,914,672

UNITED STATES PATENT OFFICE

RUDOLF PAWLIKOWSKI, OF GOERLITZ, GERMANY

FOUR-STROKE INTERNAL COMBUSTION ENGINE

Original application filed December 5, 1928, Serial No. 323,996, now Patent No. 1,893,035, and in Germany May 20, 1927. Divided and this application filed February 7, 1930. Serial No. 426,723.

The present invention relates to four-stroke internal combustion engines, particularly for pulverized fuel, and formerly constituted part of my co-pending application, Serial Number 323,996, now Patent No. 1,893,035.

In the operation of pulverized fuel engines, considerable difficulties are presented by the problem of keeping the walls of the combustion chamber and more especially the piston bottom free from incrustations and coatings of clinker which are caused by the jet of flame impinging on the piston in the direction of the axis of the cylinder. Moreover, particles of clinker produced by the process of combustion, and derived from the incrustations on the piston bottom are thrown to and fro between the piston bottom and the cylinder cover and finally become lodged between the seating surfaces of the exhaust valve. The ascending piston alone discharges at the upper dead center far too few waste gases from the cylinder for this current of air to be able to snatch up the relatively heavy particles of clinker between the seating surfaces. Furthermore, during the exhausting period, the valve seats are relatively softened on their face, owing to the action of the hot waste gases which have a temperature of approximately 600 to 1000 deg. C. and a speed of about 1500 to 3000 feet per second. Hence the particles of clinker can thus embed themselves therein and thus produce pits and cavities which cause the valve to become leaky.

According to the invention, these drawbacks are eliminated by arranging that at the end of the normal exhaust period, a stream of cold high pressure air is blown into the working space, so that the high temperature prevailing on the surface of the hot walls of the combustion space impinged by the flame is suddenly reduced. Hence the deposition of cinder incrustations is prevented, caked ash is chipped off and the detached particles of cinder are swept towards the exhaust by the current of scavenging air as usually employed in these engines. Furthermore, this supplementary scavenging air cools the seatings of the exhaust valves prior to their closing, so that the particles of clinker are disintegrated instead of having an opportunity of embedding themselves in the seatings.

Two embodiments of the invention are illustrated in the accompanying drawing in which Fig. 1 is a sectional view of a four-stroke engine of known type with a working piston, exhaust valve and suction valve; Fig. 2 is a section on the line 1—1, of Fig. 1.

Referring to Fig. 1, the working piston is denoted by 1, the exhaust valve by 2 and the suction valve by 3. 4 is a hole in the cylinder cover for receiving the pulverized coal nozzle, 5 the suction piping which merges into the suction tube 7 with an automatic plate valve 6 in between. The working piston 1 is of the stepped type and its lower step 8 acts as an air pump. One or several valves 10 and the delivery valve 11 merge into the air pump space 9. The valve 11 leads to the air reservoir 12 which is connected to the suction piping.

In Fig. 1, the piston has almost reached the end of its exhaust stroke and the exhaust valve 2 is still open. Before it closes, the suction valve 3 is opened and a clinkering and sweeping current of fresh air blown through the compression space 13. This scavenging air is produced by the air pump 9. During the ascent of the working piston, the annular step 8 of the latter causes the air, previously drawn in by the valves 10 during the descent of the piston, to be forced through the delivery valve 11 into the by-pass pipe 12 and towards the suction valve 3. The escape of this high pressure air towards the suction pipe 7 is prevented by the automatic plate valve 6, which in addition, holds the air in the reservoir 12 at the compression end, as at this time the suction valve 3 remains closed. Thus there are two delivery strokes of the air pump 9 available for each scavenging of the residual ash from the compression space 13. The clinkering and sweeping current entering through the suction valve 3 first strikes the piston bottom so that the incrustation of cinder prone to form thereon is chilled by the cold air. The masses of cinder therefore contract and break off. The high pressure air current sweeps through the exhaust valve 2 and thereby entrains the detached particles until the valve 2 is completely closed. The particles of clinker swept out of the valve 2 therefore cannot drop back and become clamped in between the head and the seating of the closing exhaust valve when the overpressure ceases.

By means of its lower step 8, the stepped piston 1 separates the piston lubricating oil, which is partly contaminated by ash and flows down from the crank drive space of the engine. The crank drive lubricating oil collecting remains sperated from the ash-containing piston lubricating oil and can thus be circulated again without requiring much purification. The entrained impure lubricating oil from the air pump space 9 separates within the space 12 from the scavenging air by means of perforated plates having their holes arranged in staggered relation, or sieves 14 and is blown off under pressure from time to time at 15.

It is furthermore within the scope of the invention to provide one or several special inlet valves for the clinkering and sweeping air on the cylinder instead of using the suction valve 3 for this purpose. This construction is shown in Fig. 2. If such special inlet valves 16 are provided, they will be opened simultaneously, or almost so, with the suction valve 3 and admit high pressure clinkering and sweeping air from the pipes 18 into the cylinder 13. The valves 16 may also be fitted with a member 17 through which the clinkering and sweeping air admitted is guided first to the piston bottom.

In addition to pulverulent fuel engines of the above type, the invention is also capable of application to all engines which can be driven by solid pulverulent fuels or liquid fuels, either together or separately or by mixtures thereof. The opening 19 for the oil nozzle is, in Fig. 1, concealed behind the nozzle opening 4 for the pulverized coal and can be seen only in Fig. 2. The invention is also applicable of course to double acting engines.

I claim:

1. A four-stroke pulverulent fuel internal combustion engine for carrying out the process set forth, and comprising a stepped piston acting as a working piston, the lower step of said piston being adapted to produce clinkering and sweeping air for catching the spent ashy cylinder lubricating oil and discharging it separately from the crank drive lubricating oil.

2. A process of removing solid deposits of burnt coal from the walls of the combustion chamber and from the shutting means of the combustion chamber in pulverulent fuel engines, which consists in lifting the suction valve before the end of the exhaust stroke, introducing a clinkering blast of cooling air into the combustion chamber by the suction valve, subjecting the solid deposits of burnt coal to the action of the clinkering blast of cooling air which suddenly chills and shrinks the deposits of clinkers so that they crack off the surface of the metal, and introducing a sweeping blast of air into the combustion chamber to expel the detached particles of clinkers through the exhaust valve.

3. A process of removing solid deposits of burnt coal from the walls of the combustion chamber and the shutting means of the combustion chamber in pulverulent fuel engines, which consists in lifting the suction valve before the end of the exhaust stroke of the piston, introducing a clinkering blast of cooling air into the combustion chamber through the suction valve, the clinkering blast being directed first to the top of the piston, subjecting the solid deposits of clinkers on the piston first to the action of the clinkering blast of cooling air, which suddenly chills and shrinks the deposits of clinkers so that they crack off the surface of the metal, and introducing a sweeping blast of air into the combustion chamber to expel the detached particles of clinkers through the exhaust valve.

4. A process of removing solid deposits of burnt coal from the walls of the combustion chamber and the shutting means of the combustion chamber in pulverulent fuel engines, which consists in lifting the suction valve before the end of the exhaust stroke, introducing a clinkering blast of cooling air into the combustion chamber through the suction valve, subjecting the solid deposits of burnt coal to the action of the clinkering blast of cooling air, which suddenly chills and shrinks the deposits of clinkers so that they crack off the surface of the metal, introducing a sweeping blast of air into the combustion chamber to expel the detached particles of clinkers through the exhaust valve while simultaneously allowing it to cool the surface of the exhaust shutting means, and closing the exhaust valve before the blast of cooling air ceases to prevent particles of clinkers when dropping back from becoming stuck between the head and the seating of the closing exhaust valve.

5. A process of removing solid deposits of burnt coal from the walls of the combustion chamber and the shutting means of the combustion chamber in pulverulent fuel engines, which consists in lifting the suction valve before the end of the exhaust stroke of the piston, introducing a clinkering blast of cooling high pressure air into the combustion chamber through the suction valve, subjecting the solid deposits of burnt coal to the action of the clinkering blast of high pressure cooling air, which suddenly chills and shrinks the deposits so that they crack off the surface of the metal, introducing a sweeping blast of high pressure air into the combustion chamber to expel the detached particles of clinkers through the exhaust valve while allowing it to simultaneously cool the surface of the exhaust shutting means, and closing the exhaust valve before the blast of the high pressure cooling air ceases to prevent particles of clinkers when dropping back from becoming stuck between the head and the seating of the closing exhaust valve.

RUD. PAWLIKOWSKI.